United States Patent
Kunhappan et al.

(10) Patent No.: US 8,184,631 B2
(45) Date of Patent: May 22, 2012

(54) METHOD FOR SPECIFYING A MAC IDENTIFIER FOR A NETWORK-INTERFACE-DEVICE

(75) Inventors: Rajagopal Kunhappan, Fremont, CA (US); Darrin P. Johnson, Mountain View, CA (US); Sunay Tripathi, San Jose, CA (US)

(73) Assignee: Oracle America, Inc., Redwood Shores, CA (US)

( * ) Notice: Subject to any disclaimer, the term of this patent is extended or adjusted under 35 U.S.C. 154(b) by 403 days.

(21) Appl. No.: 11/656,735

(22) Filed: Jan. 22, 2007

(65) Prior Publication Data

US 2008/0175246 A1    Jul. 24, 2008

(51) Int. Cl.
*H04L 12/28* (2006.01)

(52) U.S. Cl. ......... 370/392; 370/389; 370/401; 370/473

(58) Field of Classification Search .............. 370/419, 370/420, 463, 389, 392, 401, 252, 254, 445; 709/245, 238, 45
See application file for complete search history.

(56) References Cited

U.S. PATENT DOCUMENTS

| | | | | |
|---|---|---|---|---|
| 5,949,788 A | * | 9/1999 | Friedman et al. | 370/431 |
| 2004/0015966 A1 | * | 1/2004 | MacChiano et al. | 718/1 |
| 2004/0047320 A1 | * | 3/2004 | Eglin | 370/338 |
| 2004/0141468 A1 | * | 7/2004 | Christensen et al. | 370/252 |
| 2005/0172047 A1 | * | 8/2005 | Pettey | 710/20 |
| 2005/0254489 A1 | * | 11/2005 | Jain et al. | 370/389 |
| 2006/0114903 A1 | * | 6/2006 | Duffy et al. | 370/390 |
| 2006/0171303 A1 | * | 8/2006 | Kashyap | 370/228 |
| 2006/0209821 A1 | * | 9/2006 | Jung et al. | 370/389 |
| 2006/0230219 A1 | * | 10/2006 | Njoku et al. | 710/316 |
| 2007/0237088 A1 | * | 10/2007 | Hidle | 370/252 |

* cited by examiner

*Primary Examiner* — Hassan Phillips
*Assistant Examiner* — Anez Ebrahim
(74) *Attorney, Agent, or Firm* — Park, Vaughan, Fleming & Dowler LLP; Mark Spiller

(57) ABSTRACT

One embodiment of the present invention provides a system that specifies a MAC identifier for a network-interface-device in a computing device. In this system, the network-interface-device is configured to connect to a network though a port. During operation, the network-interface-device receives data packets through this port, and accepts a data packet if the data packet contains a destination that matches the MAC identifier for the network-interface-device, which can be a universally-administered MAC identifier. The system is also configured to determine whether the network-interface-device supports one or more additional MAC identifiers. If so, the system adds and activates an additional MAC identifier. By activating the newly-added MAC identifier in the computing device, the system allows the network-interface-device to logically separate data packets based on MAC identifiers.

21 Claims, 12 Drawing Sheets

METHOD FOR SPECIFYING A MAC IDENTIFIER FOR A NETWORK-INTERFACE-DEVICE

RELATED APPLICATION

The subject matter of this application is related to the subject matter in a co-pending non-provisional application by Rajagopal Kunhappan, Kais Belgaied, and Eric T. Cheng entitled "Method, Apparatus and Program Product to Use Factory-Defined Multiple MAC Addresses for Virtual NICs," having Ser. No. 11/644,561, and filing date 21 Dec. 2006.

BACKGROUND

1. Field of the Invention

The disclosed technology relates to the field of computer devices and resources.

2. Related Art

Networked systems exchange information across a network by sending data packets that encapsulate the information being exchanged. These data packets generally include a unique destination address or identifier for the data packet's destination (destinations for multicast and broadcast packets). The uniqueness of the address/identifier is in accordance with the definitions of MAC-48, EUI-48™ and EUI-64™ as defined/used in networking standards known to one skilled in the art. Networked systems require that the address/identifier be unique so that the data packet can be directed to its intended destination. The data packet also contains a source address/identifier to identify which device/resource emitted the data packet onto the network. One skilled in the art will understand that there are additional details related to broadcast and multicast data packets.

Each address/identifier that complies with the previously referenced definitions comprises two primary fields. The first field is a 24-bit identifier often referred to as an "organizationally unique identifier" (OUI) which is uniquely assigned by the IEEE Registration Authority to a requesting organization (such as a networking device manufacturer). The requesting organization is responsible for maintaining uniqueness by providing unique values for the second field (which is the "extension identifier"). The address/identifier is a concatenation of these two fields. Often, an address/identifier is permanently (or semi-permanently) installed into a networking device or permanently (or semi-permanently) associated with a specific service and is hence termed a "universally administered MAC identifier" or a "burned-in address/identifier" (because the universally administered MAC identifier is commonly "burned-into" a read-only-memory installed in a network interface card (NIC) or other "network-interface-device").

The MAC-48 and EUI-48 definitions are syntactically indistinguishable from one another and are assigned from the same numbering space. The EUI-64 definition uses an expanded numbering space that provides an expansion of the currently available address/identifiers. MAC-48, EUI-48™ and EUI-64™ are commonly referred to as the "Media Access Control (MAC) address", the "MAC identifier", the "hardware address", the "Ethernet address", etc.

For the rest of this disclosure, the term "MAC identifier" is used to mean any address/identifier that is used to identify a specific device or service on a network. One skilled in the art will understand that the terms "MAC address" and "MAC identifier" are equivalent, can be used interchangeably, and that for the rest of this document the use of one implies the use of the other.

The MAC identifier can be used by the "layer 2" networking protocols. On the Internet, the Address Resolution Protocol (ARP) converts an address in a layer 3 protocol (for example, an IP address) to a MAC identifier.

A "locally administered MAC identifier" is assigned to a device by a network administrator, and overrides the universally administered MAC identifier (the "burned-in" address). Locally administered MAC identifiers should not contain organizationally unique identifiers assigned by the IEEE (but see the subsequent discussion on "cloning"). Locally administered MAC identifiers are distinguished from universally administered MAC identifiers by a bit in the MAC identifier.

A typical host network-interface-device includes a burned-in MAC identifier. The burned-in MAC identifier is inserted into the "source" field of a data packet when the data packet is transmitted by the host network-interface-device. Furthermore, the host network-interface-device will examine all the data packets it receives and if the destination address/identifier in the data packet matches the burned-in MAC identifier, the host network-interface-device will accept the information within the data packet. Generally, the host network-interface-device will not accept data packets unless they are specifically addressed to the host network-interface-device, addressed as a multicast recognized by the host network-interface-device, or as a broadcast. However, the host network-interface-device can be conditioned to be in promiscuous mode so that all data packets seen by the host network-interface-device are provided to the next protocol level and the host network-interface-device provides no data packet filtering. Data packets sent by the host network-interface-device contain the host network-interface-device's active MAC identifier in the source field of the data packet.

For the rest of this disclosure, the term "burned-in MAC identifier" refers to the universally administered MAC identifier; the term "active MAC identifier" refers to the MAC identifier that is transmitted and/or recognized by a networking device or service; and the term "spoofed/cloned MAC identifier" refers to a universally administered MAC identifier that is not the universally administered MAC identifier assigned to the network interface card by the device's manufacturer, or a universally administered MAC identifier of another network-interface-device (and the like).

There are situations where it is useful for the active MAC identifier to be other than the burned-in MAC identifier (a universally administered MAC identifier). Some devices allow the burned-in MAC identifier to be changed. However, it is more common to "clone" the MAC identifier by providing the device with a capability of accepting and using a universally administered MAC identifier other than the universally administered MAC identifier provided by the device's manufacturer. There are numerous reasons why the ability to specify the MAC identifier is useful. These reasons include providing support for Layer 2 authentication in a firewall system (where the firewall monitors specific locally administered MAC identifiers that are periodically changed). Changing the MAC identifier is also useful when modifying a network if, for example, an internet service provider registers the universally administered MAC identifier of the device that directly connects to the ISP. Thus, if a user changes the ISP connection device, the user either must re-register the universally administered MAC identifier of the changed connection device with the ISP or clone the universally administered MAC identifier of the prior device in the changed connection device.

Turning now to difficulties related to MAC identifiers when used within some virtualized computing environments. One example of a virtualized computing environment includes a host computer system that executes an operating system (that can be a commonly-used operating system such as Solaris®, LINUX® or Microsoft Windows XP®) and/or a specialized virtualization operating system such as a hypervisor or other "virtual machine monitor". The host operating system or hypervisor manages the host computer's resources. The hypervisor can also mimic the hardware of a second computer system (using any one or combination of techniques known to one skilled in the art) such that installing the operating system on a virtual machine appears to be identical to installing on an actual physical computer.

A "virtual machine monitor" generally is an application program that executes subject to the host operating system and mimics the hardware of a second computer system whereas a hypervisor generally is an operating system that directly provides virtualization support for virtual computers. Both approaches provide a virtualized computing environment and this document uses the terms interchangeably.

The virtualized computing environment enables a host computer system to emulate other systems. For example, a computer manufactured by SUN Microsystems that is executing the Solaris® operating system and a hypervisor application can simultaneously execute programs in the host environment and at the same time mimic a processor (such as one manufactured by Intel Corporation) that is executing applications that use a windowing operating system (such as one provided by Microsoft Corporation) in a guest environment; and at the same time can also mimic a processor manufactured by Sun Microsystems that executes an unstable research operating system that is prone to crash the emulated system; all without disruption to the other virtualized computing environments executing in the real host computer. Thus, critical errors in one virtualized computing environment that crash the virtual computer will not impact the other virtualized computing environments.

The virtual computers have one or more virtual network-interface-devices. A single host network-interface-device can be carved into multiple virtual network-interface-devices each needing its own MAC identifier. The virtual network-interface-devices behave just like any other real (non-virtual) NIC for the rest of the system. NIC vendors are beginning to provide host network-interface-devices that have multiple universally administered MAC identifiers and/or multiple address slots for storing additional MAC identifiers.

One difficulty when using a host network-interface-device in a host computer environment where that host network-interface-device is used to support guest environments is that the traditional host network-interface-device only has one MAC identifier. Thus, without more, each guest environment as well as the host environment uses the same MAC identifier, which requires significant out-of-protocol processing to determine the actual destination for the data packet.

One way this problem is addressed is by configuring the virtual network-interface-device with a locally administered MAC identifier which is then used for emitting data packets through the network-interface-device, and placing the host network-interface-device into promiscuous mode (which allows all incoming data packets to be accepted by the host) and distributing the received data packets to the appropriate virtual NIC in accordance with the MAC identifier in the destination field of the data packet.

There are a number of difficulties that arise when the host network-interface-device is operated in promiscuous mode. These include, but are not limited to, performance impacts on the host computer because each data packet on the network must be examined by a higher protocol layer as the NIC does not filter any data packet; and security impacts because each data packet is copied into computer memory and thus jeopardizes network security (for example a malicious user or administrator could capture passwords etc.).

Hence, what is needed is a method and an apparatus for allowing virtual network-interface-devices to use additional MAC identifiers without the problems of the above-described techniques.

SUMMARY

One embodiment of the present invention provides a system that specifies a MAC identifier for a network-interface-device in a computing device. In this system, the network-interface-device is configured to connect to a network though a port. During operation, the network-interface-device receives data packets through this port, and accepts a data packet if the data packet contains a destination that matches the MAC identifier for the network-interface-device, which can be a universally-administered MAC identifier. The system is also configured to determine whether the network-interface-device supports one or more additional MAC identifiers. If so, the system adds and activates an additional MAC identifier. By activating the newly-added MAC identifier in the computing device, the system allows the network-interface-device to logically separate data packets based on MAC identifiers.

In a variation on this embodiment, the system determines whether the network-interface-device includes a resource that supports one or more MAC identifiers. If so, the system assigns the additional MAC identifier to the resource. For instance, the resource may include slots for storing MAC identifiers, such that adding a new MAC identifier involves adding the new MAC identifier to a slot and then activating it.

In a further variation, the resource can include a multicast resource. Note that this multicast resource may allow the system to add an additional general-purpose MAC identifier, instead of limiting the system to only adding multicast MAC identifiers. For instance, the system may use a slot in the multicast resource to store a "general-purpose" MAC identifier instead of a multicast MAC identifier.

In a further variation, the system specifies the value of the additional MAC identifier.

In a further variation, the system selects the specified value of the additional MAC identifier randomly.

In a further variation, the system selects the specified value of the additional MAC identifier from a specified block of universally-administered MAC addresses.

In a further variation, the system uses code in the computing device to track how many additional MAC identifiers can simultaneously be supported by the network-interface-device. This code supports adding, removing, and/or modifying the additional MAC identifier.

In a further variation, the computing device supports one or more computer applications, which can request the additional MAC identifier.

In a further variation, the computer application is a guest operating system that includes a virtual network-interface-device.

In a further variation, the computer application selects a slot and activates one or more additional MAC identifiers.

In a further variation, the computing device enables multiple guest operating systems to execute concurrently. In this variation, the system allows additional MAC identifiers to be activated: by a first computer application that manages allocating MAC identifiers for the multiple guest operating systems; or individually by each of one or more guest operating systems.

In a further variation, the computer application stores the value of the additional MAC identifier persistently, which enables the computer application to use the same value across multiple sessions of the computer application.

In a variation on this embodiment, the network-interface-device is a network interface card.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed.

NICs Supporting Multiple Universally-Administered MAC Identifiers

One aspect of the technology disclosed herein teaches a method for specifying a MAC identifier for a network-interface-device configured to connect to a network through a port. The network-interface-device includes multiple universally administered MAC identifiers and can accept data packets received through the port responsive to whether the data packets contain a destination address matching any active MAC identifier. The method includes reserving a first universally administered MAC identifier from the multiple universally administered MAC identifiers, and reserving a second, different from the first, universally administered MAC identifier from the multiple universally administered MAC identifiers, where the first universally administered MAC identifier and the second universally administered MAC identifier are associated with a first and second resource of the network-interface-device respectively. The MAC identifier is then assigned to one of the first resource or the second resource is activated. Other aspects include apparatus logics (including programmed general purpose logic, custom circuitry, or any combination thereof) and program products (for example, tangible computer-readable media storing program code) that can be read and executed by a CPU or other programmed general purpose logic (for example a computer) to perform the method.

Figure 1:
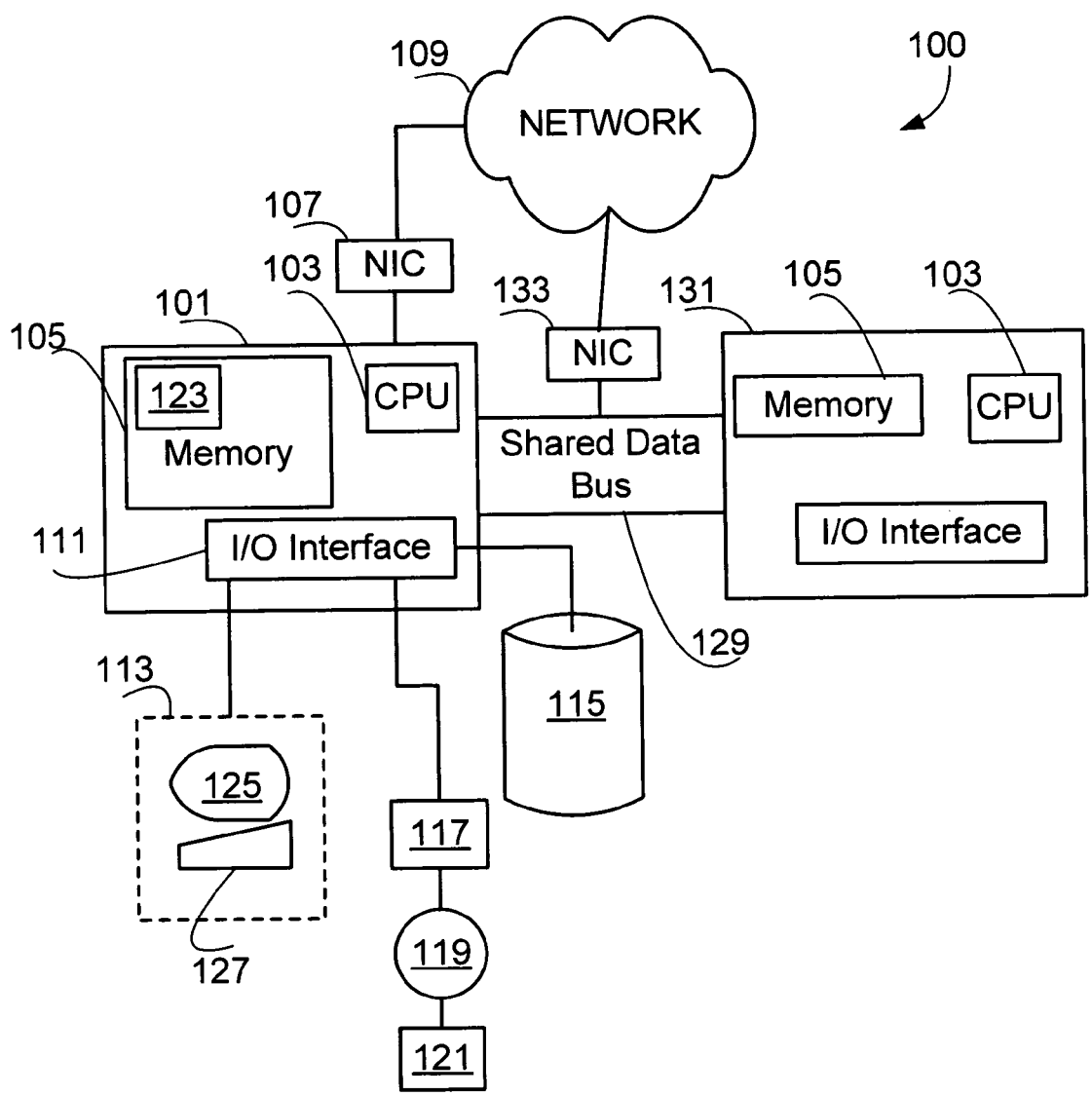
FIG. 1 illustrates a networked computer system that uses the disclosed technology in accordance with an embodiment of the present invention.

FIG. 1 illustrates a networked computer system 100 that can incorporate an embodiment. The networked computer system 100 includes a computer 101 that incorporates a CPU 103, a memory 105, and a network interface-device 107. The network interface-device 107 provides the computer 101 with access to a network 109. The computer 101 also includes an I/O interface 111 that can be connected to a user interface-device(s) 113, a storage system 115, and a removable data device 117. The removable data device 117 can read a computer-usable data carrier 119 (such as a fixed or replaceable ROM within the removable data device 117 itself (not shown); as well as a computer-usable data carrier that can be inserted into the removable data device 117 itself (such as a memory stick, CD, floppy, DVD or any other tangible media)) that typically contains a program product 121. The user interface-device(s) 113 can include a display device 125 and a user-input device(s) 127. The storage system 115 (along with the removable data device 117), the computer-usable data carrier 119, and (in some cases the network 109) comprise a file storage mechanism. The program product 121 on the computer-usable data carrier 119 is generally read into the memory 105 as an advanced host network-interface-device driver program 123 which instructs the CPU 103 to perform specified operations. In addition, the program product 121 can be provided from devices accessed using the network 109. One skilled in the art will understand that the network propagates information (such as data that defines a computer program) using one or more electromagnetic signals, visible or invisible light pulses, signals on a data bus, or signals transmitted over any wire, wireless, or optical fiber technology that allows information to be propagated from one point to another. Programs and data are commonly read from both tangible physical media (such as those listed above) and from the network 109. Thus, the network 109, like a tangible computer-readable physical media, can be considered as a computer-usable data carrier. One skilled in the art will understand that not all of the displayed features of the computer 101 need to be present for the all embodiments that implement the techniques disclosed herein.

The computer 101 can be connected to a shared data bus 129 (that is shared with a second computer 131). The shared data bus 129 can support a shared network interface card 133. The shared network interface card 133 either must be in promiscuous mode, have two network ports each with a unique universally administered MAC identifier, or use the subsequently disclosed technology to accept data packets from a single port that is associated with at least two active MAC identifiers.

The problem addressed by the technology described herein can also exist in a single processor system (say the computer 101) that includes more than one separately identifiable networked resource accessed through a single port to the network.

Figure 2:
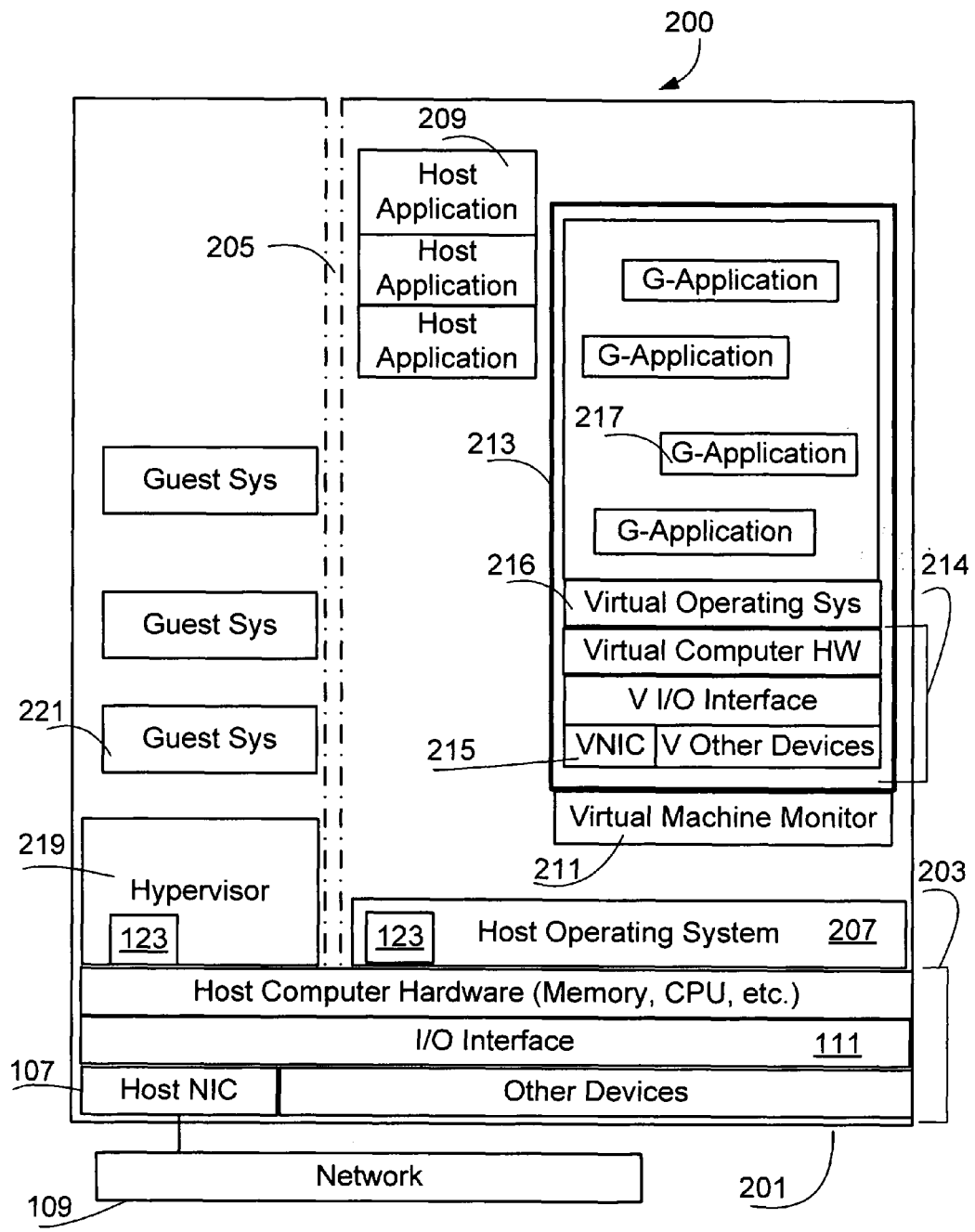
FIG. 2 illustrates a virtualized computing environment architecture that uses the disclosed technology in accordance with an embodiment of the present invention.

FIG. 2 illustrates virtualized computing environment architectures 200 that can also use the technology disclosed herein. The technology can be incorporated within a computer system 201 that includes a tangible computer processor 203 that can include the network interface-device 107 to access the network 109, the I/O interface 111 and etc. that have been previously discussed. Programs executing on the tangible computer processor 203 can take at least two configurations. The two configurations are separated by a configuration separator 205. The underlying tangible computer processor 203 can be the same for each configuration. But in one configuration the tangible computer processor 203 executes a hypervisor to support virtualized computer environments, while in the other configuration a virtual machine monitor that executes as an operating-system-controlled application supports the virtualized computer environments.

The right-hand-side of the configuration separator 205 illustrates a virtual machine monitor configuration executed by the tangible computer processor 203 that uses a host operating system 207 to manage the memory, I/O, etc of the tangible computer processor 203 in a manner well known to one skilled in the art. As part of, and/or working in conjunction with, the host operating system 207 is the advanced host network-interface-device driver program 123 that contains instructions executed by the tangible computer processor 203 to perform the methods of the technology disclosed herein. The host operating system 207 allocates resources and/or provides services to a host application program 209 (one of which is labeled). One of the host application programs can be a virtual machine monitor 211 that emulates a virtual machine environment 213 such that the resources of a virtual computer 214 (including virtual devices such as a virtual network-interface-device 215) can be managed by a virtual operating system 216. Executing within the virtual machine environment 213 and under control of the virtual operating system 216 can be one or more applications such as a guest application 217.

One skilled in the art will understand that the host application program 209 and the virtual machine environment 213 are both controlled and serviced by the host operating system 207 to, for example, provide for the allocation of host memory and schedule execution by the tangible computer processor 203. Within the constraints of the resources allocated to the virtual machine monitor 211 by the host operating system 207, the virtual operating system 216 controls the resources and execution of the guest applications including access to devices, networks, files and/or other resources. As the virtual operating system 216 initializes the virtual network-interface-device 215 the virtual machine monitor 211 invokes capabilities in the advanced host network-interface-device driver program 123 of the network interface-device 107 as will be subsequently described.

Another example virtualized computing environment configuration that can be executed by the tangible computer processor 203 is shown on the left-hand-side of the configuration separator 205. In this configuration, a hypervisor 219 (that contains the advanced host network-interface-device driver program 123) provides resource support for virtual computers such as a guest computer system 221.

There are many other possible configurations that support virtualized computing environments. The technology described herein can be applied to any of these and in particular can be applied to diagnostic programs, test environments, configuration environments, hot backup environments etc.

For the rest of this document, the term "hypervisor" will include any hardware resource management program such as an operating system, diagnostic, or stand-alone program in an embedded system.

The technology disclosed herein treats the available MAC identifiers within a network-interface-device as a resource (one skilled in the art will understand that one example of a network-interface-device is a Network Interface Card (NIC)). An entity (for example, a device, a computer, a specialized circuit, and/or executing program, etc.) that needs to use the network-interface-device first determines whether the network-interface-device has an available resource and, if so, reserves the resource, uses the resource, and, when no longer needed, releases the resource. Thus, the entity that reserves the resource has complete responsibility for that resource. No other entity can access that resource. Where the network-interface-device is a network interface card, the disclosed technology prevents "MAC address stealing" from underneath a "virtual NIC". If some entity needs to modify a reserved MAC identifier, that entity must coordinate with the reserving entity to do so.

Figure 3:
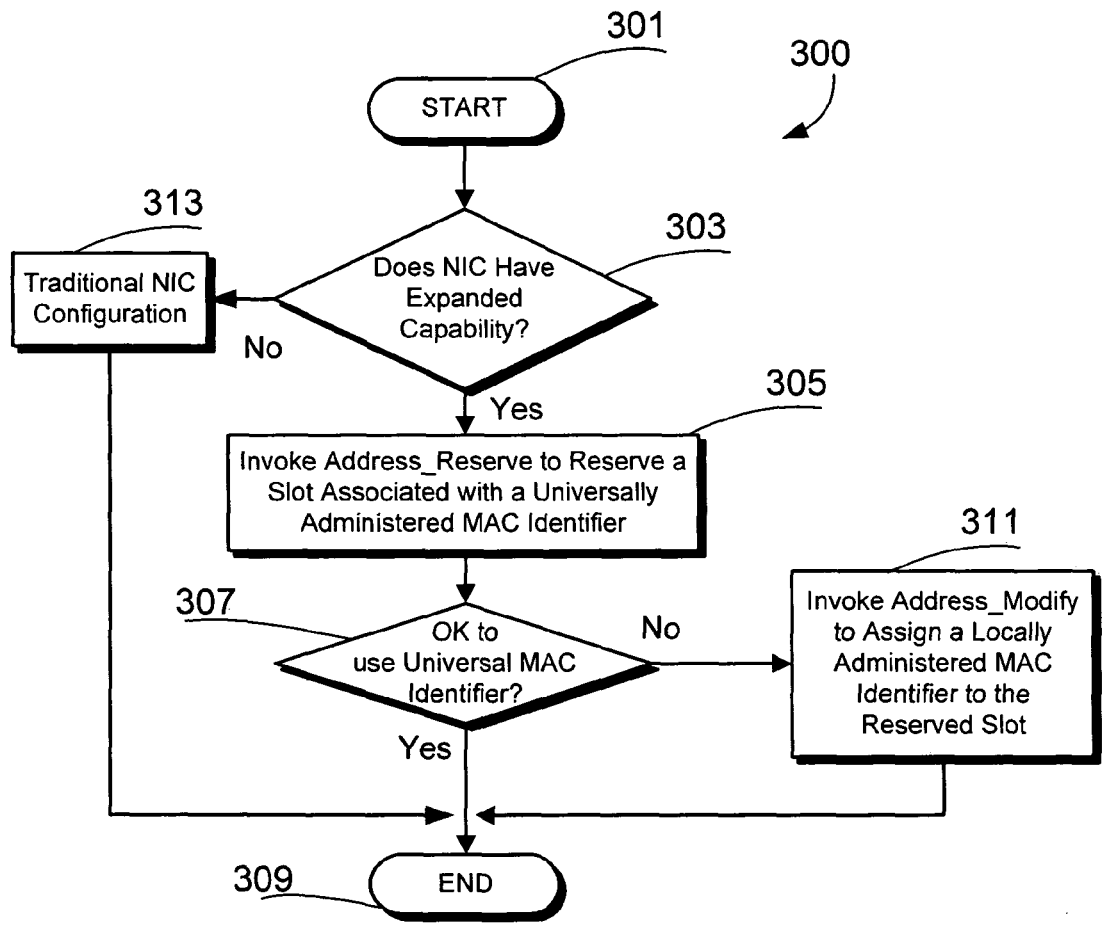
FIG. 3 presents a flow chart illustrating a virtual-host network-interface-device association process in accordance with an embodiment of the present invention.

FIG. 3 illustrates a virtual-host network-interface-device association process 300 that enables a virtual network-interface-device in a virtualized computing environment to use one of a set of universally administered MAC identifiers in a suitably capable host network-interface-device. The virtual-host network-interface-device association process 300 can be invoked by a virtual network-interface-device as it is initialized by the guest operating system or hypervisor. The virtual-host network-interface-device association process 300 is used to condition a network-interface-device to use a unique active MAC identifier for network communications to and from the virtual computer.

The host network-interface-device is interfaced to a network through a port and, if suitably capable, includes a set of universally administered MAC identifiers. The host network-interface-device also has a set of slots. Each slot associates a resource with an active MAC identifier (which can be a universally administered MAC identifier, a spoofed/cloned universally administered MAC identifier, or a locally administered MAC identifier). The resource can be, for example, hardware or software executing on a computer that, performs some operation on receiving a data packet containing the active MAC identifier. If the resource emits a data packet onto the network the source address in the data packet will be set to the active MAC identifier associated with the resource via the slot. In addition, the host network-interface-device is conditioned to accept any data packet received through the port if the data packet contains a destination address that matches any one of a set of active MAC identifiers in an accept filter even if the host network-interface-device is not in promiscuous mode.

A guest operating system can include a virtual network-interface-device as a resource. The guest operating system (or hypervisor) initializes the virtual network-interface-device and invokes the virtual-host network-interface-device association process 300 to associate the virtual network-interface-device (the resource) with a slot in the host network-interface-device.

The slot also associates an active MAC identifier with the resource such that data packets emitted onto the network for the resource will have the source address of the active MAC identifier associated with the resource. In addition, the host network-interface-device will accept data packets that have a destination address that match any of the active MAC identifiers. The accepted data packets will be dispatched to the resource associated with the slot/active MAC identifier (for example to the virtual network-interface-device). Thus, the slots associate a resource and its active MAC identifier.

Thus, the multiple MAC identifiers associated with the port can identify separate resources in, or associated with, the network-interface-device.

Where the network-interface-device is a NIC each slot generally associates a resource that will source and/or sink data packets. Furthermore, if the network-interface-device provides some other service or capability that can be invoked by receipt of a data packet, that service can be associated with a specific active MAC identifier.

The virtual-host network-interface-device association process 300 initiates at a 'start' terminal 301 when invoked by a hypervisor and continues to a 'NIC feature' decision process 303 that can invoke the Address_Support procedure (subsequently described with respect to FIG. 4) to verify that the network-interface-device has a 'multiple universally administered MAC identifier capability' that allows multiple active MAC identifiers to be associated with a port. If this capability exists, the virtual-host network-interface-device association process 300 continues to a 'reserve MAC address' process 305 that can (for example) invoke the Address_Reserve procedure (subsequently described with respect to FIG. 5) to reserve one of the available slots in the network-interface-device.

If the network-interface-device is configured to automatically activate a universally administered MAC identifier when a slot is reserved, the network-interface-device will associate one of its set of universally administered MAC identifiers with the slot and add that associated MAC identifier to the accept filter within the host network-interface-device. Thus, the host network-interface-device will start accepting data packets that have the active MAC identifier in the destination field. In embodiments where the network-interface-device only reserves a slot and returns a universally administered MAC identifier from the set of universally administered MAC identifiers, the virtual-host network-interface-device association process 300 will explicitly activate the provided MAC identifier for the slot (as is subsequently described with respect to FIG. 7).

Next the virtual-host network-interface-device association process 300 continues to an 'overwrite MAC' decision process 307 that determines (responsive to explicit programming, system preference, etc.) whether the host network-interface-device is to associate a universally administered MAC identifier or a locally administered MAC identifier with the slot. If the universally administered MAC identifier is to be used (and if the network-interface-device is configured to automatically add the associated universally administered MAC identifier to the accept filter), the virtual-host network-interface-device association process 300 returns the reserved slot and its associated universally administered MAC identifier as it completes through an 'end' terminal 309.

However, if at the 'overwrite MAC' decision process 307, the decision is to associate a locally administered MAC identifier with the slot instead of a universally administered MAC identifier, the virtual-host network-interface-device association process 300 invokes a 'specify locally administered MAC' process 311 to associate the locally administered MAC identifier with the slot which will cause the locally administered MAC identifier to be added to the accept filter such that the network-interface-device will start recognizing data packets addressed with that locally administered MAC identifier. One skilled in the art after reading the disclosure herein will also understand that a spoofed/cloned universally administered MAC identifier can be used instead of the locally administered MAC identifier.

Looking now at the 'NIC feature' decision process 303. If the network-interface-device does not have the expanded capability previously described, the virtual-host network-interface-device association process 300 continues to a 'traditional network-interface-device configuration' process 313 that uses previously known methods for conditioning the network-interface-device to accept data packets intended for the virtual network-interface-device. This requires that the traditional network-interface-device be placed into promiscuous mode so that it will accept all data packets and its associated driver or daemon will distribute the received data packets to each of the active virtual computers. Other well known techniques are used to emit packets on the network that have the correct source MAC identifier.

If the network-interface-device has the multiple universally administered MAC identifier-per-port capability, subsequent operation of the virtual-host network-interface-device association process 300 will reserve additional slots with their respective universally administered MAC identifiers and remove the reserved slot/universally administered MAC identifier from an available slot pool. Each of the reserved universally administered MAC identifiers is unique.

Figure 4:
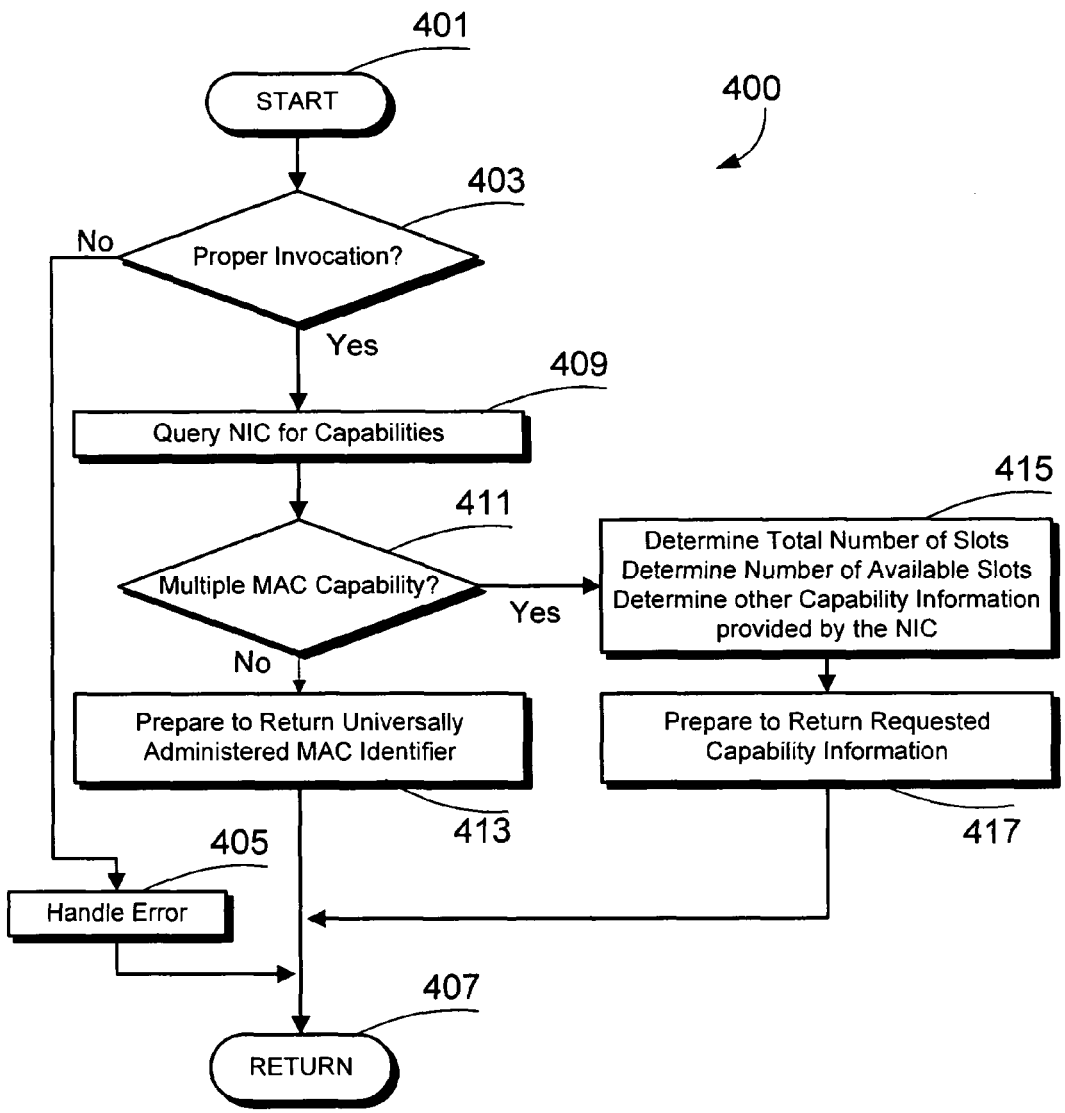
FIG. 4 presents a flow chart illustrating an Address_Support process in accordance with an embodiment of the present invention.

FIG. 4 illustrates an Address_Support process 400 that can be invoked by the hypervisor to obtain information about the host network-interface-device. The Address_Support process 400 initiates at a start terminal 401, and continues to a 'well-formed invocation' decision procedure 403 that validates any parameters provided in the invocation and performs any required initialization. If the provided parameters are not valid and/or the Address_Support process 400 cannot initialize, the Address_Support process 400 continues to an 'error handler' procedure 405 that performs any required event/error logging and associated recovery. The Address_Support process 400 then completes through a return terminal 407.

If the 'well-formed invocation' decision procedure 403 determines that the parameters are valid the Address_Support process 400 continues to a 'query network-interface-device capabilities' procedure 409 that acquires data defining the capabilities of the host network-interface-device either from the hosts network-interface-device itself or from other data sources that can provide the information (such as a database). Once the capabilities of the host network-interface-device are determined, the Address_Support process 400 continues to a 'multiple MAC capability' decision procedure 411 that examines these capabilities to determine whether multiple universally administered MAC identifiers were "burned-into" the host network-interface-device.

If only a single universally administered MAC identifier was burned-into the network-interface-device, the Address_Support process 400 continues to a 'prepare return of universally administered MAC' procedure 413 that obtains the assigned universally administered MAC identifier from the network-interface-device or from the previously obtained capabilities and prepares that information for return to the hypervisor such that the hypervisor will be able to place the network-interface-device into promiscuous mode and prepare to distribute data packets to guest operating systems using well known techniques. Next the Address_Support process 400 continues to the return terminal 407 to return the prepared information.

One skilled in the art will understand that other embodiments can return a failure status instead of returning the single universally administered MAC identifier of the traditional network-interface-device. In such embodiments the 'prepare return of universally administered MAC' procedure 413 is not needed and the Address_Support process 400 returns a failure status to indicate that the network-interface-device does not include a set of universally administered MAC identifiers.

If the 'multiple MAC capability' decision procedure 411 determines that the network-interface-device includes multiple universally administered MAC identifiers, the Address_Support process 400 continues to, an 'obtain capability information from NIC' procedure 415 that further queries the network-interface-device (unless the information of interest is already provided by the 'query network-interface-device capabilities' procedure 409) for the total number of slots, the number of available slots, and other capabilities of the network-interface-device that may be of interest. Once the capability information is determined, a 'prepare return of capability information' procedure 417 prepares the information to be passed back to the hypervisor.

Figure 5:
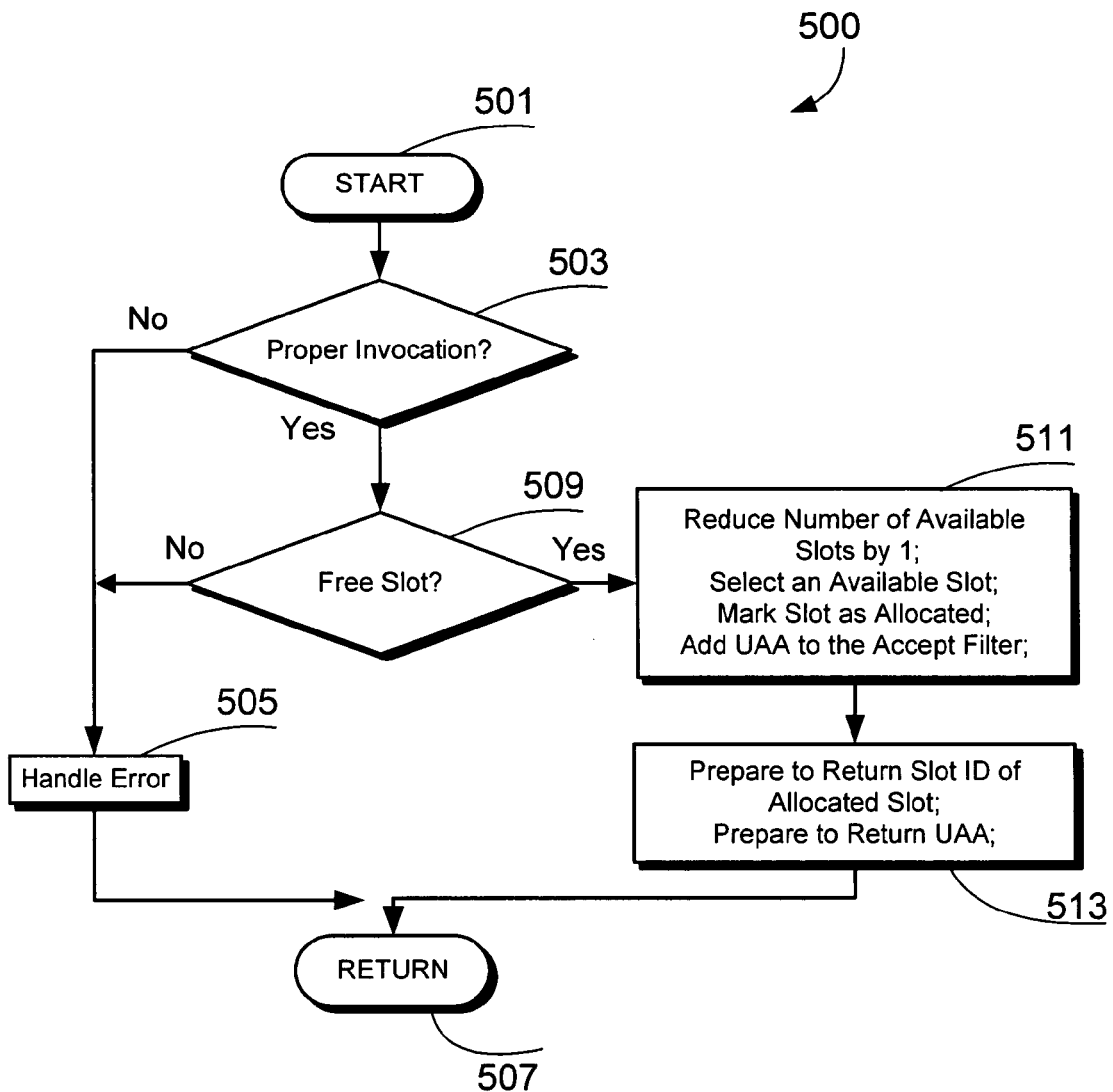
FIG. 5 presents a flow chart illustrating an Address_Reserve process in accordance with an embodiment of the present invention.

FIG. 5 illustrates an Address_Reserve process 500 that can be invoked by the hypervisor to reserve a slot in the host network-interface-device. The Address_Reserve process 500 initiates at a start terminal 501 and continues to a 'well-formed invocation' decision procedure 503 that validates any parameters provided in the invocation and performs any required initialization. If the provided parameters are not valid or the Address_Reserve process 500 cannot initialize, it continues to an 'error handler' procedure 505 that performs any required event/error logging and associated recovery and the Address_Reserve process 500 then completes through a return terminal 507.

If the 'well-formed invocation' decision procedure 503 determines that the parameters are valid the Address_Reserve process 500 continues to a 'free slot' decision procedure 509 that determines whether there is at least one slot that has not been reserved. If no slot is available, the Address_Reserve process 500 continues to the 'error handler' procedure 505 for processing as previously described.

If, at the 'free slot' decision procedure 509, a slot is available, the Address_Reserve process 500 continues to a 'reserve slot' procedure 511 that reserves one of the available slots as well as one of the available universally administered MAC identifiers. Next a 'prepare return of slot identifier and MAC information' procedure 513 prepares the return information. The return information comprises the slot identifier for the resource and can include the MAC identifier activated for that slot.

In some embodiments, as the slot is reserved, any one of the universally administered MAC identifiers from the available slot pool of burned-in identifiers is reserved. In other embodiments, a specific universally administered MAC identifier that is assigned to the slot is reserved.

As each resource attempts to access the host network-interface-device it receives a slot that associates a specific MAC identifier to the resource. For example, when two resources need to use the host network-interface-device, a separate slot and universally administered MAC identifier is assigned to each resource responsive to a resource-access request. In some embodiments the universally administered MAC identifier is automatically activated by adding it to the accept filter. In some embodiments the universally administered MAC identifier is returned to the hypervisor (to be replaced by a spoofed/cloned universally administered MAC identifier, or locally administered MAC identifier, or used as is) for explicit activation as is subsequently described with respect to FIG. 7.

In some embodiments the Address_Reserve process 500 can be invoked multiple times by a hypervisor or other computer program, or invoked multiple times by separate programs. Thus, the hypervisor can support multiple virtual network-interface-devices (multiple resources) by invoking the Address_Reserve process 500 as each virtual network-interface-device is initialized and thus reserves a slot for the resource that associates an active MAC identifier in the host network-interface-device with the resource.

In some embodiments the Address_Reserve process 500 can be invoked by different applications (or computers such as illustrated in FIG. 1) such as a diagnostic, an operating system, a hypervisor, and a Solaris Zone/Container.

One skilled in the art will understand that the association between slots and universally administered MAC identifiers can be created at the time the universally administered MAC identifiers are burned into the network-interface-device, or can be dynamically associated at the time a slot is reserved.

If the network-interface-device has the multiple universally administered MAC identifier-per-port capability, subsequent operation of the Address_Reserve process 500 will reserve additional slots with their respective universally administered MAC identifiers and remove the reserved slot/universally administered MAC identifier from the available slot pool. Each of the reserved universally administered MAC identifiers is unique.

Figure 6:
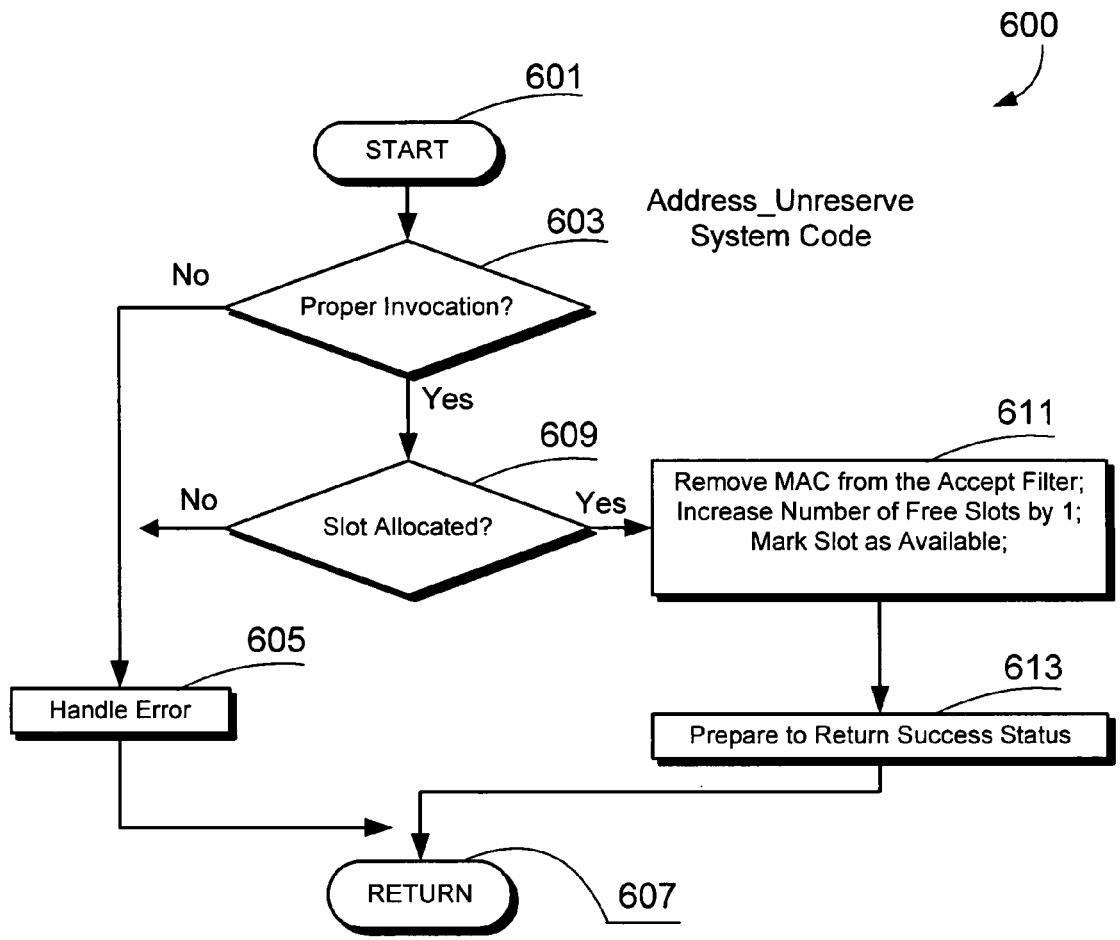
FIG. 6 presents a flow chart illustrating an Address_Unreserve process in accordance with an embodiment of the present invention.

FIG. 6 illustrates an Address_Unreserve process 600 that can be invoked by the hypervisor in response to a resource becoming disabled or dismounted (for example, by termination of a guest operating system, hypervisor, diagnostic, application program, etc. that uses the resource). The Address_Unreserve process 600 initiates at a start terminal 601, and continues to a 'well-formed invocation' decision procedure 603 that validates any parameters provided in the invocation and performs any required initialization. If the provided parameters are not valid, the Address_Unreserve process 600 continues to an 'error handler' procedure 605 that performs any required event/error logging, associated recovery, preparation for return of failure status, and then the Address_Unreserve process 600 completes through a return terminal 607. The provided parameter is the slot identifier obtained by the Address_Reserve process 500 of FIG. 5.

If the 'well-formed invocation' decision procedure 603 determines that the parameters are valid the Address_Unreserve process 600 continues to a 'reserved slot' decision procedure 609 that determines whether the slot identifier references a reserved slot. If the slot identifier does not references a reserved slot, the Address_Unreserve process 600 continues to the 'error handler' procedure 505 for processing as has been previously described.

If, at the 'reserved slot' decision procedure 609, the provided slot identifier references a reserved slot, the Address_Unreserve process 600 continues to a 'release slot' procedure 611 that removes the MAC identifier (if any) associated with the slot from the accept filter (thus, the network-interface-device will no longer accept data packets identified by that MAC identifier); increases the number of free slots by one, and marks the slot as being available. Next, a 'prepare return success status' procedure 613 prepares the return information (generally a success status) and the Address_Unreserve process 600 completes through the return terminal 607.

Figure 7:
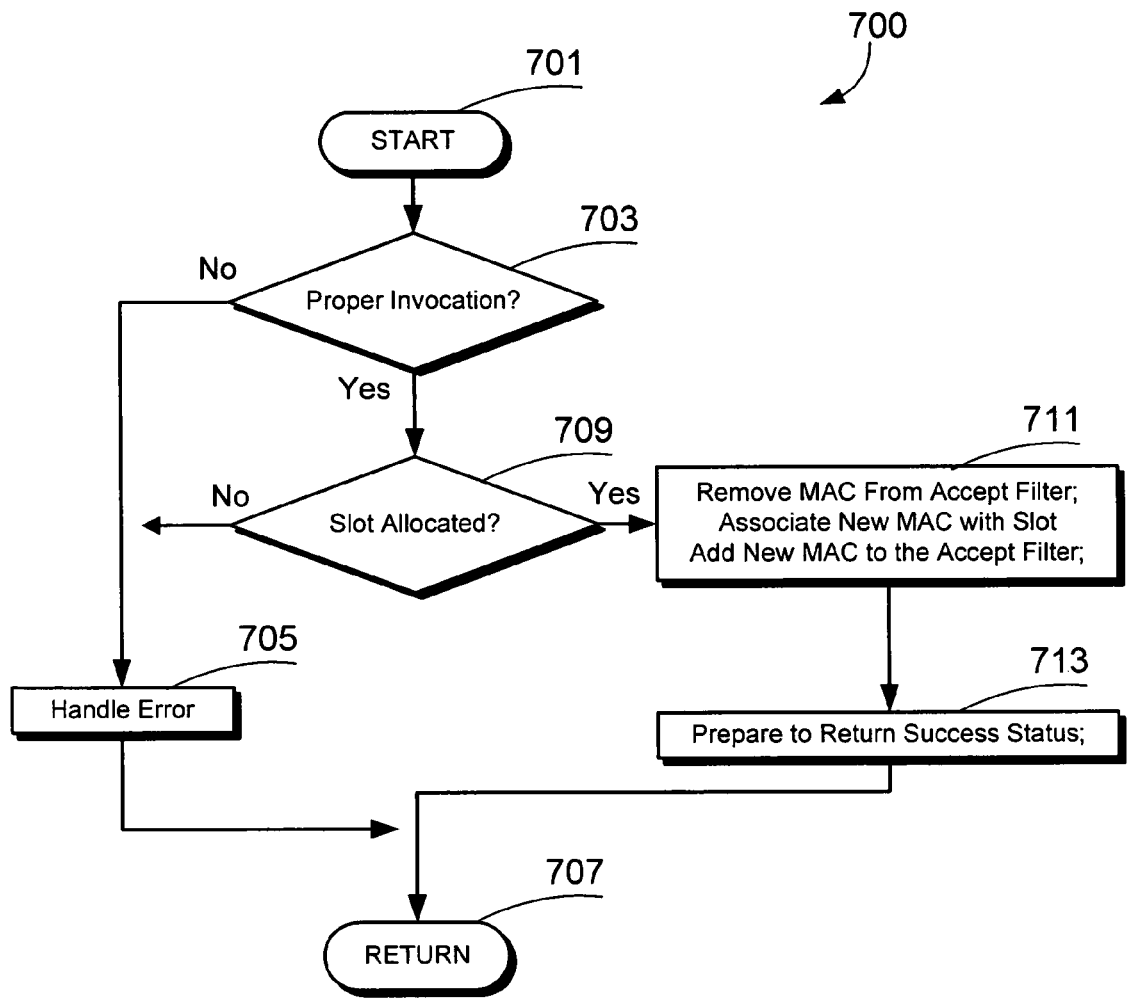
FIG. 7 presents a flow chart illustrating an Address_Modify process in accordance with an embodiment of the present invention.

FIG. 7 illustrates an Address_Modify process 700 that can be invoked by the hypervisor to change the active MAC identifier associated with a slot. The Address_Modify process 700 initiates at a start terminal 701, and continues to a 'well-formed invocation' decision procedure 703 that validates any parameters provided in the invocation and performs any required initialization. If the provided parameters are not valid, the Address_Modify process 700 continues to an 'error handler' procedure 705 that performs any required event/error logging, associated recovery, preparation for return of failure status, and then the Address_Modify process 700 completes through a return terminal 707. The parameters include a slot identifier and can include a MAC identifier (such as the universally administered MAC identifier, a locally administered MAC identifier or a spoofed/cloned universally administered MAC identifier).

If the 'well-formed invocation' decision procedure 703 determines that the parameters are valid, the Address_Modify process 700 continues to a; 'reserved slot' decision procedure 709 that determines whether the slot identifier has been reserved. If the specified slot has not been reserved, the Address_Modify process 700 continues to the 'error handler' procedure 705 and returns through the return terminal 707 as has been previously described.

However, if the slot has been reserved, the Address_Modify process 700 continues to an 'assign MAC identifier' procedure 711 that first removes the MAC identifier that has been associated with the specified slot (if any) from the accept filter, associates the locally administered MAC identifier with the specified slot and adds the new MAC identifier to the accept filter such that the network-interface-device will now accept data packets addressed to the new MAC identifier instead of the MAC identifier previously associated with the slot. Thus, the Address_Modify process 700 changes the active MAC identifier for a specified slot.

The Address_Modify process 700 then continues to a 'prepare return of success status' procedure 713 to prepare status indicating success, and then completes through the return terminal 707.

Figure 8:
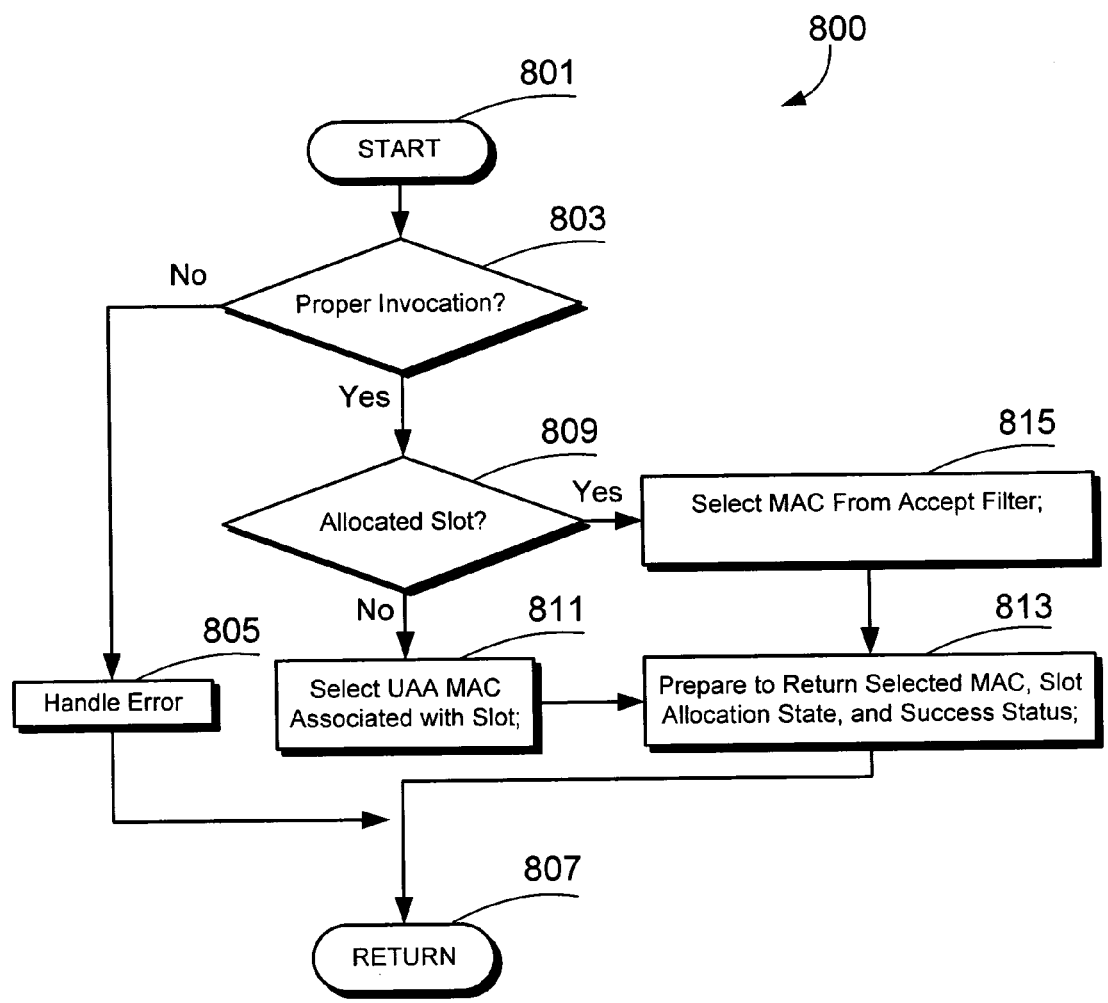
FIG. 8 presents a flow chart illustrating an Address_Get process in accordance with an embodiment of the present invention.

It is sometimes advantageous to determine what MAC identifier is assigned to a slot. FIG. 8 illustrates an Address_Get process 800 that can be invoked by the hypervisor to obtain a slot's MAC identifier. The Address_Get process 800 initiates at a start terminal 801, and continues to a 'well-formed invocation' decision procedure 803 that validates any parameters provided in the invocation and performs any required initialization. If the provided parameters are not valid, the Address_Get process 800 continues to an 'error handler' procedure 805 that performs any required event/error logging, associated recovery, and preparation for return of failure status. The Address_Get process, 800 then completes through a return terminal 807. The parameters can include a slot identifier.

If the 'well-formed invocation' decision procedure 803 determines that the parameters are valid, the Address_Get process 800 continues to a 'slot reserved' decision procedure 809 that determines whether the slot is currently reserved. If the slot has not been reserved, the Address_Get process 800 continues to a 'select universally administrated MAC address' procedure 811 that selects the universally administered MAC identifier that has been "burned-in" by the manufacturer for that slot (for network-interface-devices that have a set of universally administered MAC identifiers that can be dynamically reserved for the slots, the 'select universally administrated MAC address' procedure 811 can select a range of universally administered MAC identifiers for return). Once the universally administered MAC identifier(s) has been selected for return, the Address_Get process 800 continues to a 'prepare return of selected MAC address' procedure 813 that prepares the selected MAC identifier(s), the slot allocation state, and success status and then returns through the return terminal 807 as has been previously described.

If at the 'slot reserved' decision procedure 809 the slot is allocated, the Address_Get process 800 continues to a 'select MAC from accept-filter' procedure 815 that retrieves the active MAC identifier associated with the slot (if any) and continues to the 'prepare return of selected MAC address' procedure 813 for prepare the active MAC identifier for return as previously described.

One skilled in the art will understand that the allocation of portions of the work between the host network-interface-device and procedures on the tangible computer processor 203 is a design detail. The technology disclosed herein assumes an accept filter, and some process to associate a resource and/or slot with an active MAC identifier in the accept filter. The technology also assumes that the accept filter can hold two or more active MAC identifiers, and that the accept filter interfaces to the network through a port such that the port can accept data packets having different unique MAC identifiers without being in promiscuous mode.

One skilled in the art and after having read the disclosure herein will understand that the process of using the network-interface-device (that has the previously described capabilities) can be included with a diagnostic, an operating system, a hypervisor, and a Solaris Zone/Container. Such a one will also understand that in multi-processor embodiments (such as shown in FIG. 1) where a network-interface-device is shared between at least two of the processors, that each processor can reserve a slot for its own use.

In one embodiment an implementation of a software interface implements the previously disclosed technology. A software interface is a rule set that enables access to the desired functionality. In the programming context a software interface is commonly referred to as an Application Programming Interface (API). The subsequently described software interfaces can be implemented as programmed-procedures, as invocation of trap instructions, or any other API technique known in the art. One skilled in the art will understand that there are many substantially equivalent API designs that can be used for this purpose and that those described below are but one example of an API that would fall within the claimed subject matter.

In this embodiment, five software-interfaces are added to a host operating system or hypervisor to enable a virtual client to have access to a network interface card. These software-interfaces are:

---

1) "Address_Support",
2) "Address_Reserve",
3) "Address_Unreserve",
4) "Address_Get", and
5) "Address_Modify".

---

The Address_Support software-interface can query a network-interface-device to return capability information about the device. This capability information can include the total number of slots/universally administered MAC identifiers available to the network interface card, and the current number of slots that are available (those MAC identifiers in the available slot pool) as well as other information such as the starting and ending universally administered MAC identifiers.

The Address_Reserve software-interface can reserve one of the available slots from the available slot pool. The reserved slot is now "in use" and the associated universally administered MAC identifier is now the active MAC identifier for the reserved slot. The interface returns the reserved slot identifier and its associated universally administered MAC identifier. The network interface card can add the reserved universally administered MAC identifier to the accept filter when the reserve slot identifier is returned. Thus data packets that are directed to a MAC identifier that matches one of the active MAC identifiers in the accept filter will be received by the network interface card and passed to the host operating system/hypervisor. The slot identifier can be used by the Address_Unreserve interface to return the slot to the available slot pool and to remove the associated active MAC identifier from the accept filter.

The Address_Unreserve software-interface can use the slot identifier (provided to the host operating system by the Address_Reserve interface) to return the slot to the available slot pool. This removes the active MAC identifier from the accept filter and also makes the universally administered MAC identifier currently associated with the slot available for subsequent use. Thus, data packets directed to the newly released MAC identifier are no longer recognized by the network interface card and are ignored in the course of normal operation of the network interface card. Note that the active MAC identifier removed from the accept filter need not be the universally administered MAC identifier associated with the slot identifier because subsequent software-interface operations may have overridden the universally administered MAC identifier with a locally administered MAC identifier or a spoofed/cloned universally administered MAC identifier.

The Address_Modify software-interface can use the slot identifier provided to the host operating system by the Address_Reserve interface and a MAC identifier (such as a locally administered MAC identifier, a spoofed/cloned universally administered MAC identifier or a universally administered MAC identifier provided by the network interface card to allow a virtual client to specify a MAC identifier for the specified slot. The network interface card can remove the existing active MAC identifier associated with the slot identifier from the accept filter, and can add the provided MAC identifier to the accept filter.

The Address_Get software-interface can receive the slot identifier and in response returns the active MAC identifier in the accept filter associated with the specified slot identifier. In some embodiments, if the slot is not reserved, this software-interface can return the universally administered MAC identifier associated with the specified slot identifier. The software-interface can also provide the relevant reservation status.

One embodiment of the technology is subsequently described.

When the guest operating system initializes a virtual network-interface-device it triggers the hosting hypervisor to allocate a resource. In one embodiment the hypervisor can execute programmed procedures that are consistent with the following pseudo code:

```
Mac_address active_mac;
Mac_address uaa_mac;
Int resource_slot;
If not Address_Reserve(\dev\nic, uaa_mac,
resource_slot) {
    raise no_resource_err;
}
active_mac = uaa_mac;
```

In this embodiment, Address_Reserve returns a boolean value to indicate whether the specified NIC was able to reserve a universally administered MAC identifier. If the NIC was unable to reserve a MAC (for example, if no entries are left in the available slot pool), Address_Reserve returns a FALSE and the hypervisor posts an error to indicate that the resource is not available (thus, a virtual network-interface-device would be marked as off-line, disabled, or the like). The universally administered MAC identifier associated with the slot is removed from the available slot pool and added to the accept filter. Thus, the universally administered MAC identifier becomes an active MAC identifier.

When the guest computer is turned off, or when the guest operating system disables the virtual network-interface-device, the hypervisor releases the active MAC identifier by:
    Address_Unreserve(\dev\nic, resource_slot);
If the hypervisor is conditioned to use a locally administered MAC identifier (either by a request from the host operating system or by predefined preference or suchlike) the hypervisor can activate the requested MAC identifier by:

```
Active_mac = new_mac;
Address_Modify(\dev\nic, active_mac, resource_slot)
```

To acquire the active MAC identifier from the NIC for a particular slot, the hypervisor can execute:
    active_mac=Address_Get(\dev\nic, resource_slot);
To get status about the NIC, the hypervisor can execute:
    Address_Support(\dev\nic, total_slots, available_slots, recognized_macs());
One skilled in the art will understand that the available slot pool can be implemented as an unavailable slot pool with the appropriate logic transformations.

As used herein, a procedure is a self-consistent sequence of steps that can be performed by logic implemented by a programmed computer, specialized electronics or other circuitry or a combination thereof that lead to a desired result. These steps can be defined by one or more computer instructions. These steps can be performed by a computer executing the instructions that define the steps. Further, these steps can be performed by circuitry designed to perform the steps. Thus, the term "procedure" can refer (for example, but without limitation) to a sequence of instructions, a sequence of instructions organized within a programmed-procedure or programmed-function, a sequence of instructions organized within programmed-processes executing in one or more computers, or a sequence of steps performed by electronic or other circuitry, or any logic. In particular, a first reservation logic, a second reservation logic, an assignment logic, activation logic and a locally administered MAC identifier assignment logic are such logics. In addition, one skilled in the art will understand, for example, that the first reservation logic and the second reservation logic need only differ by the input value provided to the logic and thus, a first invocation of a logic can be distinguished from a second invocation of the logic.

One skilled in the art will understand that the network transmits information (such as informational data as well as data that defines a computer program). The information can also be embodied within a carrier-wave or otherwise propagated across a network using electromagnetic signals, visible or invisible light pulses, signals on a data bus, or signals transmitted over any wire, wireless, or optical fiber technology that allows such signal propagation. Programs and data are commonly read from both tangible physical media (such as a compact, floppy, or magnetic disk) and from a network. Thus, the network, like a tangible physical media, can be considered a computer-usable data carrier.

One skilled in the art will understand that the technology disclosed herein provides a novel solution to assigning MAC identifiers to a network-interface-device that has multiple universally administered MAC identifiers "burned-in" the device.

From the foregoing, it will be appreciated that the technology has (without limitation) the following advantages:

1) Efficient use of the network-interface-device in circumstances where promiscuous mode would normally be required because the network-interface-device can be configured to pass data packets having a destination address that matches any of a number of universally administered MAC identifiers or locally administered MAC identifiers.
2) The ability to configure offline Stand-by computers that have the EXACT same CompterName, IP, and MAC identifier as the Primary computers. Thus, if a Stand-by computer is placed online (replacing a primary computer), then absolutely no Address Resolution Protocol (ARP) refresh needed. Because the Stand-by computer is identical (from the network perspective) to the offline Primary computer, the Stand-by computer comes online sooner than with the previously known technology (and with less network overhead).
3) The ability to use a single NIC for virtualized computing environments while still using universally administered MAC identifiers for the virtualized computing environments.
4) In the situation where software operation is conditioned on the existence of a NIC that has a specific universally administered MAC identifier, the software can be installed on a second machine (for example a Stand-by system) with a different NIC.
5) Simplifies network diagnostics and testing platforms as a single NIC can be configured to emulate one or more traditional NICs. In addition, the ability to monitor a network for data packets addressed to a limited number of MAC identifiers improves the reliability of network monitors (because the NIC passes fewer data packets than does a traditional NIC in promiscuous mode; because the monitor is not overwhelmed with uninteresting data packets, it has a better chance of detecting the data packets of interest).

NICs Supporting Additional Customizable MAC Identifiers

In one embodiment of the present invention, the network-interface-device includes resources that support additional customizable MAC identifiers. For instance, a network-interface-device may include a number of address slots into which the system can add additional MAC identifiers.

In one embodiment of the present invention, a network-interface-device may include one or more address slots for system-specified multicast MAC identifiers. Note that these slots do not need to be limited to multicast MAC identifiers. For instance, the system may use such address slots to store additional "general purpose" MAC identifiers instead of multicast MAC identifiers.

Multicast techniques are typically used for the simultaneous delivery of information to a group of destinations. Multicast is similar to broadcast in that a single multicast packet may be of interest to multiple computing devices, but typically an application on a specific computing device needs to register interest in a multicast stream before the computing device will accept the multicast packets from that stream. In multicast packets, a "multicast bit" is set in the MAC identifier. In contrast, the multicast bit is not set in unicast packets. When the multicast bit is set, a portion of the MAC identifier is used to identify the multicast address group, thereby allowing multiple simultaneous multicast streams to be distinguished from one another.

After a user registers interest in a multicast stream, the computing device accepts data packets destined for the multicast MAC identifier associated with the multicast stream. If the network-interface-device on the computing device only supports hardware filtering for a single MAC identifier, the network-interface-device switches to "promiscuous mode" and uses software filtering to identify packets with the specified multicast MAC identifier. As mentioned previously, performing such filtering operations in software involves much higher overhead than hardware filtering, resulting in reduced performance.

As mentioned previously, some network-interface-devices can include additional hardware resources that can provide additional address slots for application- and/or network-specific purposes (such as multicast). For instance, a network-interface-device may include functionality to perform hardware filtering on an application-specified multicast MAC identifier. Hence, such a network-interface-device may include a number of slots that can be used for such purposes, and can provide application programmer interfaces (APIs) to access these features. These resources can be used to support additional customizable MAC identifiers.

In one embodiment of the present invention, the system determines whether a network-interface-device supports one or more additional MAC identifiers, and if so, selects and activates an additional MAC identifier. By activating the additional MAC identifier in the computing device, the system allows the network-interface-device to logically separate data packets. Note that if the network-interface-device includes sufficient resources to support multiple additional MAC identifiers, the system may configure the network-interface-device to simultaneously reserve a mix of additional MAC identifiers for "normal" (e.g. unicast) traffic as well as additional protocol-specific (e.g. multicast-specific) MAC identifiers. Note also that only a small set of applications and/or users typically use such protocol-specific MAC identifiers, leaving these resources available for other purposes.

Figure 9:
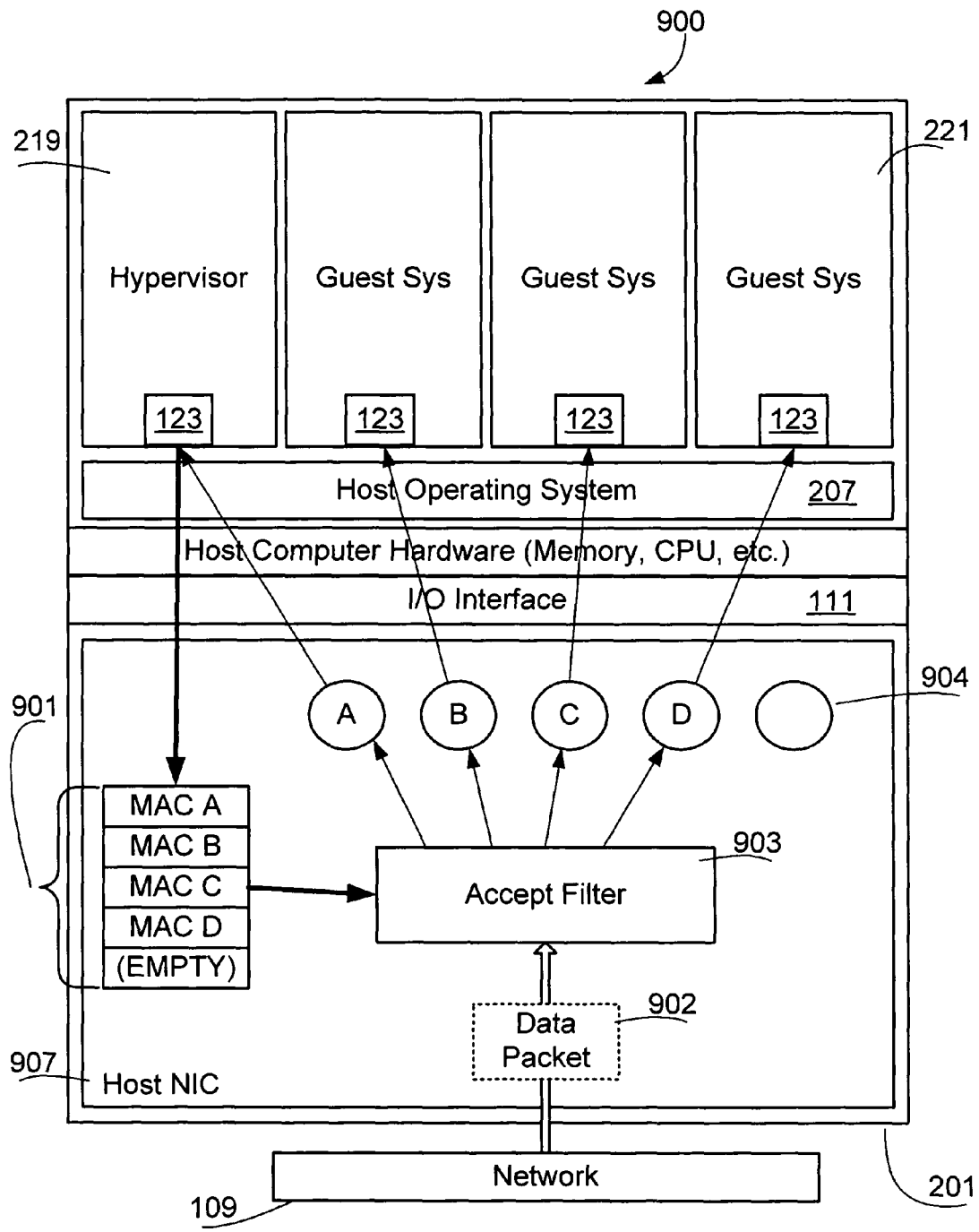
FIG. 9 illustrates a virtualized computing environment architecture that uses a network-interface-device that supports additional system-specified MAC identifiers in accordance with an embodiment of the present invention.

FIG. 9 illustrates a virtualized computing environment architecture 900 which is executed on a computing device that includes a network-interface-device 907 that supports additional MAC identifiers. In this architecture 900, the network-interface-device 907 includes a number of address slots 901 to which the system can assign MAC identifiers. When a data packet 902 is received from the network, the network-interface-device 907 uses an accept filter 903 to determine whether the destination address in the data packet 902 matches one of the MAC identifiers in the address slots 901. If a match is found, the system forwards the data packet 902 to an appropriate "receive ring" 904, and notifies the I/O interface 111. The I/O interface 111 and the layers above the I/O system can then use mappings between receive rings and applications to forward the data packet 902 to the appropriate application.

In one embodiment of the present invention, the network-interface-device includes a resource such as a "default ring" (which may be associated with the universally-administered MAC identifier) that detects broadcast packets. Broadcast packets are detected and then copied to other active MAC identifiers in the system.

In one embodiment of the present invention, one application (such as the hypervisor 219) manages the multiple MAC identifiers. This application queries the network-interface-device to determine whether it supports multiple MAC identifiers, and reserves MAC identifiers on behalf of other applications in the system, such as the guest system 221. After the hypervisor 219 has set up the an additional MAC identifier for the guest system 221, the guest system 221 can interact with the operating system directly to send and receive packets directly via the advanced host network-interface-device driver program 123. In this embodiment, the hypervisor 219 can maintain information on the number of slots currently in use, prevent MAC identifier collisions, and enforce sharing of available MAC identifier slots between multiple applications and/or virtual operating systems. In an alternate embodiment of the present invention, each application and/or virtual operating system can interact with the network-interface-device directly to reserve a MAC identifier.

As mentioned previously, the technology disclosed herein treats the available MAC identifiers within a network-interface-device as a resource. As described previously for a network-interface-device with multiple universally-administered MAC identifiers, an entity that needs to use the network-interface-device first determines whether the network-interface-device has an available resource. If so, the entity reserves the resource, uses the resource, and, when the resource is no longer needed, releases the resource. The resulting processes are similar to those described in FIGS. 3-8, with the difference that instead of selecting a universally-administered MAC identifier associated with a slot, the system can choose a slot from a set of available slots and can associate a system-specified MAC identifier with that slot.

Figure 10:
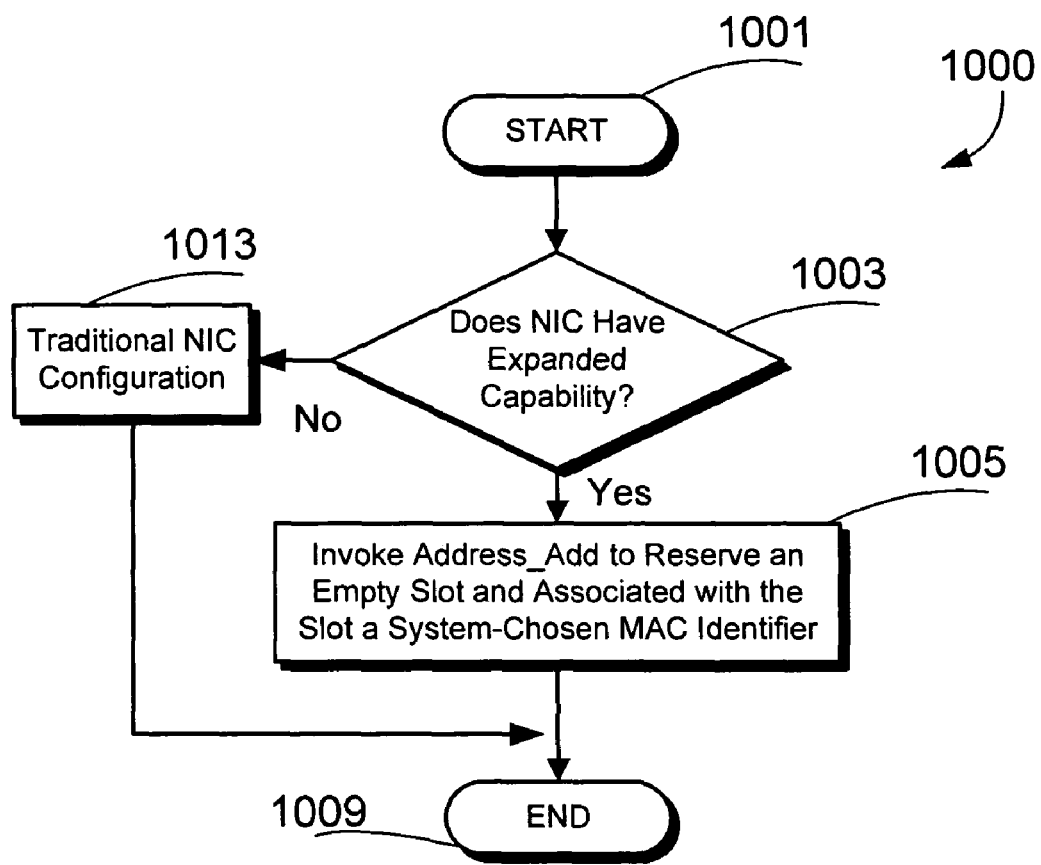
FIG. 10 presents a flow chart illustrating a virtual-host network-interface-device association process for a system that includes a network-interface-device that supports additional system-specified MAC identifiers in accordance with an embodiment of the present invention.

FIG. 10 illustrates a virtual-host network-interface-device association process 1000 that enables a virtual network-interface-device in a virtualized computing environment to use one of a set of available slots in a suitably-capable host network-interface-device. The virtual-host network-interface-device association process 1000 initiates at a 'start' terminal 1001 when invoked by a hypervisor and continues to a 'NIC feature' decision process 1003 that can invoke the Address_Support procedure (subsequently described with respect to FIG. 11) to verify that the network-interface-device has a 'multiple MAC identifier capability' that allows multiple active MAC identifiers to be associated with a port. If this capability exists, the virtual-host network-interface-device association process 1000 continues to a 'add MAC address' process 1005 that can (for example) invoke the Address_Add procedure (subsequently described with respect to FIG. 12) to reserve one of the available slots in the network-interface-device and add a MAC identifier to it. If the newly-added MAC identifier is to be used (and if the network-interface-device is configured to automatically add the associated MAC identifier to the accept filter), the virtual-host network-interface-device association process 1000 returns the reserved slot and its associated MAC identifier as it completes through an 'end' terminal 1009. If the network-interface-device does not have the expanded capability previously described, the virtual-host network-interface-device association process 1000 continues to a 'traditional network-interface-device configuration' process 1013 that uses previously known methods for conditioning the network-interface-device to accept data packets intended for the virtual network-interface-device.

If the network-interface-device has the multiple MAC identifier-per-port capability, subsequent operation of the virtual-host network-interface-device association process 1000 will reserve additional slots with their respective system-chosen MAC identifiers and will remove the reserved slot from an available slot pool. Note that each of the added MAC identifiers is typically unique.

Figure 11:
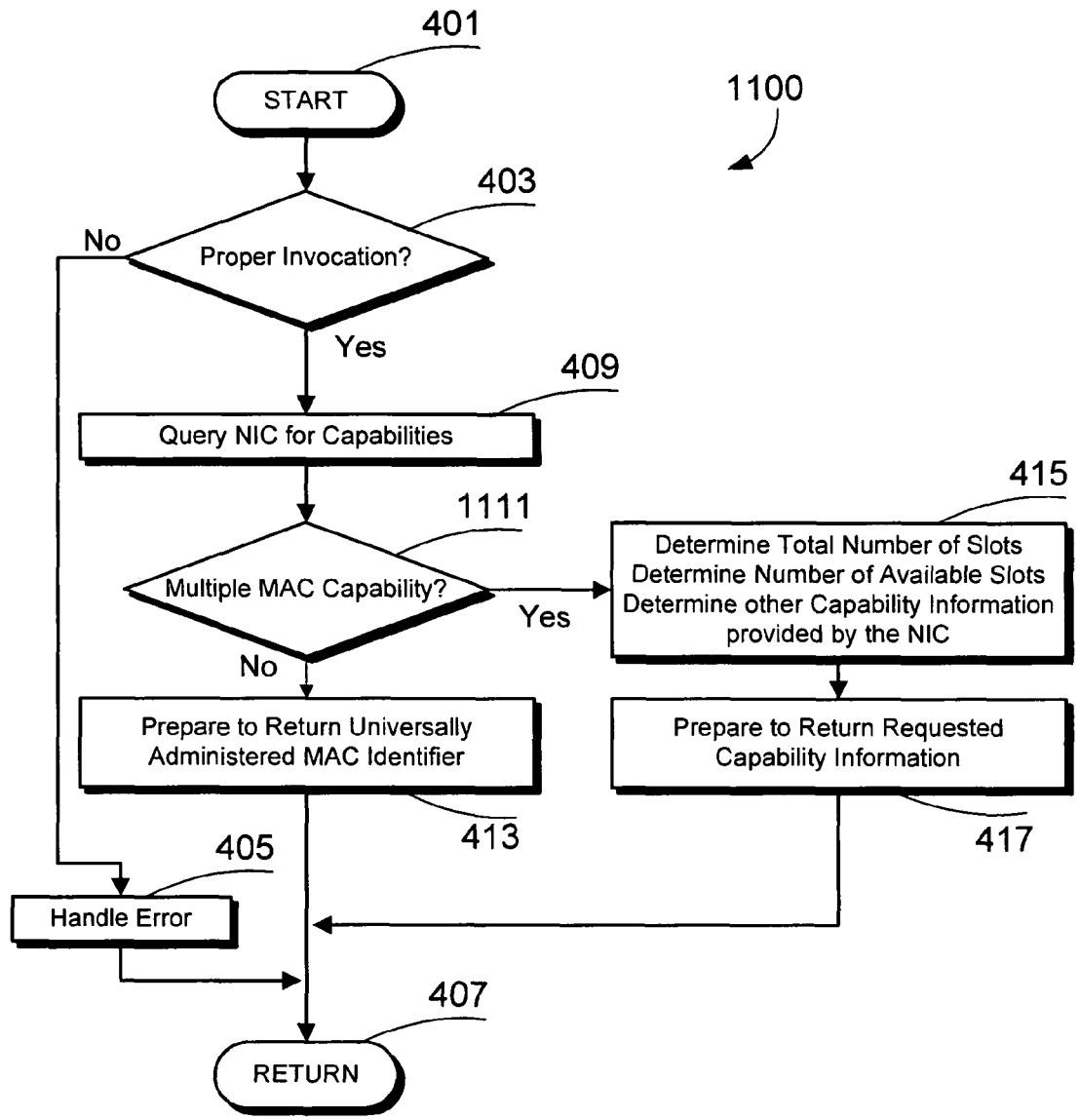
FIG. 11 presents a flow chart illustrating a modified Address_Support process in accordance with an embodiment of the present invention.

FIG. 11 illustrates an Address_Support process 1100 that can be invoked by the hypervisor to obtain information about the host network-interface-device. Note that this process is very similar to the Address_Support process 400 in FIG. 4, with a modified 'multiple MAC capability' decision procedure 1111 (as opposed to decision procedure 411 in FIG. 4). In FIG. 11, the multiple MAC capability decision procedure 1111 determines whether the network-interface-device includes slots for multiple system-chosen MAC identifiers. If so, the Address_Support process 1100 continues to an 'obtain capability information from NIC' procedure 415.

Figure 12:
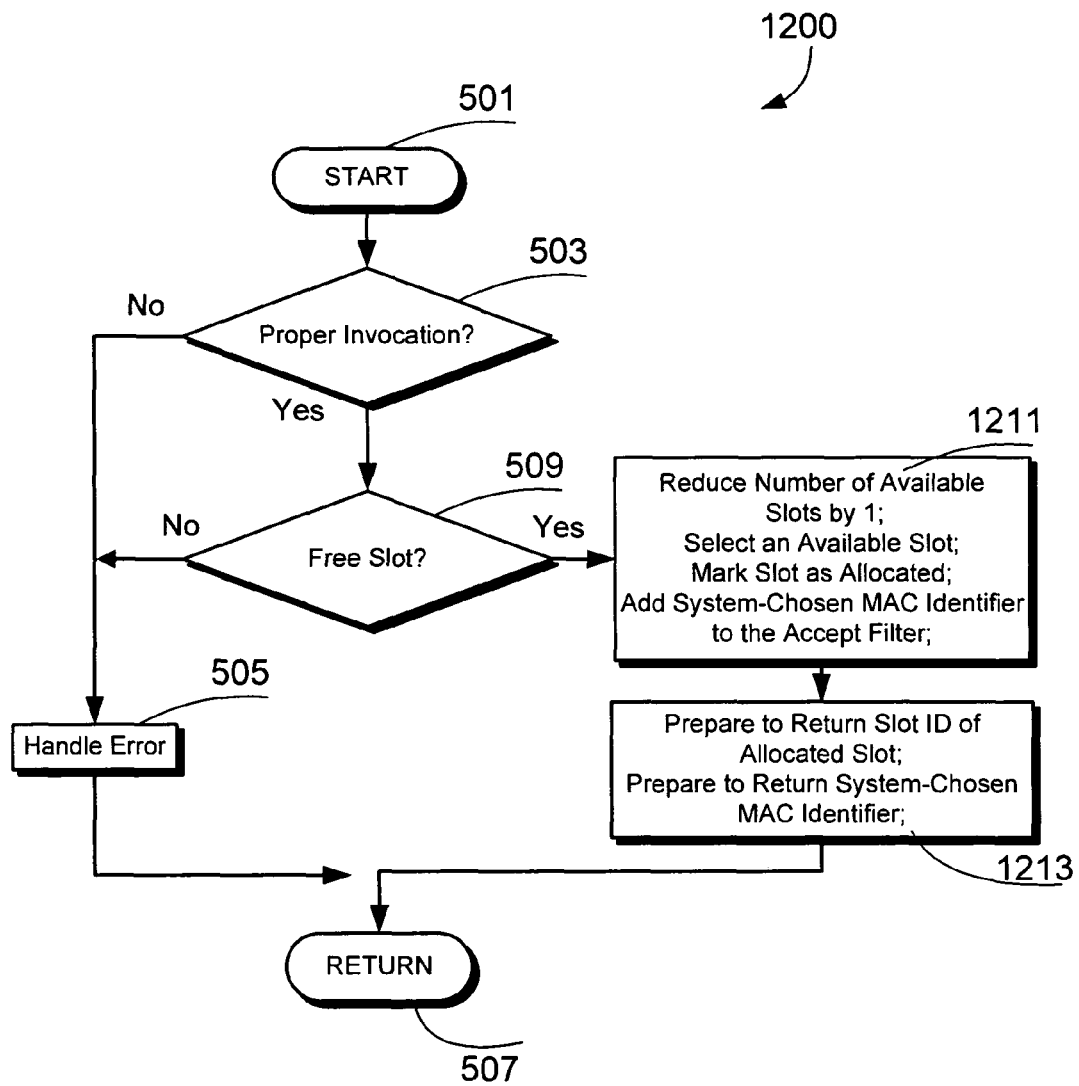
FIG. 12 presents a flow chart illustrating an Address_Add process in accordance with an embodiment of the present invention.

FIG. 12 illustrates an Address_Add process 1200 that can be invoked by the hypervisor to reserve a slot in the host network-interface-device. The Address_Add process 1200 is very similar to the Address_Reserve process 500 in FIG. 5, with the difference that if the 'free slot' decision procedure 509 determines whether there is at least one slot that is not currently in use, the Address_Add process 1200 continues to a 'add' procedure 1211 that reserves one of the available slots and adds to that slot a system-chosen MAC identifier. After this system-chosen MAC identifier is added to the accept filter, the system prepares a 'prepare return of slot identifier and MAC information' procedure 1213 that prepares return information that can include the slot identifier for the resource and the system-chosen MAC identifier activated for that slot.

The Address_Add process 1200 process, when combined with a network-interface-device that supports multiple system-defined MAC identifiers, can be substituted for the Address_Reserve process 500 in the variety of embodiments described previously. The Address_Add process 1200 can be paired with an Address_Remove process similar to the Address_Unreserve process 600 described previously, where the Address_Remove process uses a slot identifier returned by the Address_Add process 1200 to remove a MAC address added by the Address_Add process 1200. The Address_Remove process marks the address slot as unused, and instructs the network-interface-device to stop filtering on the MAC address that is being removed from the address slot.

Note that the previously-described Address_Support, Address_Reserve and Address_Unreserve procedures can be modified to provide Address_Support, Address_Add and Address_Remove procedures that reflect the Address_Support, Address_Add and Address_Remove processes described above. Note that the previously-described Address_Modify, and Address_Get processes and procedures can also be used by one skilled in the art to provide similar functionality for a network-interface-device that allows the specification of multiple MAC addresses. Moreover, the modified Address_Modify procedure can provide an interface for clients to specify a slot id and new MAC address to modify a MAC address that has previously been added. The modified Address_Get procedure in turn can return the MAC address used for a given slot id.

In one embodiment of the present invention, the system selects MAC identifiers randomly. Note, however, that while the address space for MAC identifiers is large, the use of random MAC identifiers can lead to address collisions, both among a number of randomly-assigned MAC identifiers as well as with other universally-administered MAC identifiers present on a given network. In an alternate embodiment of the present invention, the system can select a MAC identifier from a block of MAC identifiers (e.g. using an OUI) allocated by a vendor for a specific purpose.

In a further embodiment of the present invention, the system persistently stores the value of a MAC identifier for a given computer application, so that the computer application can be configured to use the same value across multiple sessions. By using a persistent address across multiple sessions, the system can avoid problems associated with updating MAC identifiers cached in other systems.

In summary, a network-interface-device that includes several slots for system-specified MAC identifiers can be used to provide functionality similar to that of a network-interface-device with multiple universally-administered MAC identifiers. A system including such a network-interface-device can perform hardware filtering for a number of MAC identifiers, thereby saving the overhead involved in software filtering.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for specifying a MAC identifier for a network-interface-device in a computing device, where the network-interface-device is configured to connect to a network through a single port, where the network-interface-device is configured to accept a data packet received through the port if the data packet contains a destination that matches the MAC identifier, where the network-interface-device includes a universally-administered MAC identifier, the method comprising:

determining whether the network interface device supports more than one MAC identifier for the single port by acquiring data that describes the capabilities of the network interface device and determining from the acquired data if the capabilities include supporting multiple MAC identifiers for the single port;

if so, selecting and activating an additional MAC identifier, wherein selecting and activating the additional MAC identifier comprises associating a resource with the additional MAC identifier in an accept filter for the network-interface-device, wherein the network-interface-device uses the accept filter to determine whether a destination address in a data packet matches one of the MAC identifiers; and receiving from a hypervisor a command to release the additional MAC identifier, wherein releasing the additional MAC identifier comprises removing the additional MAC identifier from the accept filter;

wherein activating the additional MAC identifier facilitates the network-interface-device accepting and logically separating data packets based on the additional MAC identifier.

2. The method of claim 1, wherein determining whether the network-interface-device supports one or more additional MAC identifiers involves:

determining whether the networking-interface-device includes a resource that supports one or more MAC identifiers; and if so, assigning the additional MAC identifier to the resource.

3. The method of claim 2, wherein the resource includes a multicast resource, wherein the multicast resource supports one or more additional MAC identifiers; and wherein the additional MAC identifier is assigned to the multicast resource.

4. The method of claim 2, wherein the method further involves specifying the value of the additional MAC identifier.

5. The method of claim 4, wherein the specified value is selected randomly.

6. The method of claim 4, wherein the specified value is selected from a specified block of universally-administered MAC addresses.

7. The method of claim 2, wherein code in the computing device tracks how many additional MAC identifiers can simultaneously be supported by the network-interface-device; and wherein the code supports activating, removing, and/or modifying the additional MAC identifier.

8. The method of claim 4, wherein the computing device supports one or more computer applications; and wherein the additional MAC identifier is requested by a computer application.

9. The method of claim 8, wherein the computer application is a guest operating system that includes a virtual network-interface-device.

10. The method of claim 8, wherein the computer application selects and activates one or more additional MAC identifiers.

11. The method of claim 9, wherein the computing device enables multiple guest operating systems to execute concurrently; and wherein additional MAC identifiers are activated:

by a first computer application that manages allocating MAC identifiers for the multiple guest operating systems; or individually by each of one or more guest operating systems.

12. The method of claim 8, wherein the computer application stores the value of the additional MAC identifier persistently; and wherein storing the value allows the computer application to use the same value across multiple sessions of the computer application.

13. The method of claim 1, wherein the network-interface-device is a network interface card.

14. A non-transitory computer-readable storage medium storing instructions that when executed by a computer cause the computer to perform a method for specifying a MAC identifier for a network-interface-device in a computing device, where the network-interface-device is configured to connect to a network through a single port, where the network-interface-device is configured to accept a data packet received through the port if the data packet contains a destination that matches the MAC identifier, where the network-interface-device includes a universally-administered MAC identifier, the method comprising:

determining whether the network interface device supports more than one MAC identifier for the single port by acquiring data that describes the capabilities of the network interface device and determining from the acquired data if the capabilities include supporting multiple MAC identifiers for the single port;

if so, selecting and activating an additional MAC identifier, wherein selecting and activating the additional MAC identifier comprises associating a resource with the additional MAC identifier in an accept filter for the network-interface-device, wherein the network-interface-device uses the accept filter to determine whether a destination address in a data packet matches one of the MAC identifiers; and receiving from a hypervisor a command to release the additional MAC identifier, wherein releasing the additional MAC identifier comprises removing the additional MAC identifier from the accept filter;

wherein activating the additional MAC identifier facilitates the network-interface-device accepting and logically separating data packets based on the additional MAC identifier.

15. The non-transitory computer-readable storage medium of claim 14, wherein determining whether the network-interface-device supports one or more additional MAC identifiers involves:

determining whether the networking-interface-device includes a resource that supports one or more MAC identifiers; and if so, assigning the additional MAC identifier to the resource.

16. The non-transitory computer-readable storage medium of claim 15, wherein the resource includes a multicast resource, wherein the multicast resource supports one or more additional MAC identifiers; and wherein the additional MAC identifier is assigned to the multicast resource.

17. The non-transitory computer-readable storage medium of claim 15, wherein the method further involves specifying the value of the additional MAC identifier.

18. The non-transitory computer-readable storage medium of claim 17, wherein the specified value is selected randomly.

19. The non-transitory computer-readable storage medium of claim 15, wherein code in the computing device tracks how many additional MAC identifiers can simultaneously be supported by the network-interface-device; and wherein the code supports activating, removing, and/or modifying the additional MAC identifier.

20. An apparatus that specifies a MAC identifier for a network-interface-device in a computing device, where the network-interface-device is configured to connect to a network through a single port, where the network-interface-device is configured to accept a data packet received through the port if the data packet contains a destination that matches the MAC identifier, where the network-interface-device includes a universally-administered MAC identifier, comprising:

a determining mechanism configured to determine whether the network interface device supports more than one MAC identifier for the single port by acquiring data that describes the capabilities of the network interface device and determining from the acquired data if the capabilities include supporting multiple MAC identifiers for the single port;

an activation mechanism configured to select and activate an additional MAC identifier, wherein selecting and activating the additional MAC identifier comprises associating a resource with the additional MAC identifier in an accept filter for the network-interface-device, wherein the network-interface-device uses the accept filter to determine whether a destination address in a data packet matches one of the MAC identifiers; and a deactivation mechanism configured to receive from a hypervisor a command to release the additional MAC identifier, wherein releasing the additional MAC identifier comprises removing the additional MAC identifier from the accept filter wherein activating the additional MAC identifier facilitates the network-interface-device accepting and logically separating data packets based on the additional MAC identifier.

21. The method of claim 1, wherein acquiring the data that describes the capabilities of the network interface device includes acquiring the data from the network interface device itself or from one or more other data sources that host the information.

* * * * *